(12) United States Patent
Tsujimura et al.

(10) Patent No.: US 9,442,469 B2
(45) Date of Patent: Sep. 13, 2016

(54) HOUSEHOLD ELECTRICAL APPLIANCE AND METHOD FOR CONTROLLING HOUSEHOLD ELECTRICAL APPLIANCE

(75) Inventors: Satoshi Tsujimura, Hyogo (JP); Toshihisa Ikeda, Kyoto (JP); Yasuo Yoshimura, Shiga (JP); Naofumi Nakatani, Shiga (JP); Tetsuya Kouda, Osaka (JP); Kazunori Kurimoto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 369 days.

(21) Appl. No.: 13/880,671

(22) PCT Filed: Oct. 7, 2011

(86) PCT No.: PCT/JP2011/005667
§ 371 (c)(1),
(2), (4) Date: Apr. 19, 2013

(87) PCT Pub. No.: WO2012/053158
PCT Pub. Date: Apr. 26, 2012

(65) Prior Publication Data
US 2013/0211560 A1 Aug. 15, 2013

(30) Foreign Application Priority Data
Oct. 22, 2010 (JP) ................................. 2010-237940

(51) Int. Cl.
*G06F 19/00* (2011.01)
*G05B 15/02* (2006.01)
(Continued)

(52) U.S. Cl.
CPC .......... *G05B 15/02* (2013.01); *A47L 15/0047* (2013.01); *A47L 15/4293* (2013.01);
(Continued)

(58) Field of Classification Search
USPC ....... 700/291, 292, 218, 217, 12, 13, 19, 90; 134/18; 705/14.53, 412
See application file for complete search history.

(56) References Cited

U.S. PATENT DOCUMENTS 4,644,320 A * 2/1987 Carr .................... H02J 13/0006
340/12.37
4,998,024 A * 3/1991 Kirk ....................... G06Q 50/06
307/35
(Continued)

FOREIGN PATENT DOCUMENTS

JP 05-168787 A 7/1993
JP 2006-130057 A 5/2006
(Continued)

OTHER PUBLICATIONS

International Search Report for International Application No. PCT/JP2011/005667, dated Jan. 10, 2012, 1 page.

*Primary Examiner* — Kidest Bahta
(74) *Attorney, Agent, or Firm* — Brinks Gilson & Lione (57) ABSTRACT

A washer-dryer is provided with a time shift function for performing timer presetting processing on the basis of a time shift computation result which indicates an operation start time suitable for operation. The washer-dryer includes: an input operation unit for allowing a user to perform operations for operating the washer-dryer; a display unit for displaying information relating to the operation of the washer-dryer; and an operation control unit for controlling the operation of the washer-dryer on the basis of the time shift computation result. When a start button on the input operation unit is operated by the user, the operation control unit automatically performs the timer presetting processing on the basis of the time shift computation result and also displays a timer preset time at the display unit.

7 Claims, 9 Drawing Sheets

(51) Int. Cl.

| | | |
|---|---|---|
| *A47L 15/00* | (2006.01) | |
| *A47L 15/42* | (2006.01) | |
| *D06F 33/02* | (2006.01) | |
| *D06F 39/00* | (2006.01) | |
| *D06F 39/04* | (2006.01) | |
| *H02J 3/14* | (2006.01) | |

(52) U.S. Cl.
CPC ............ *D06F33/02* (2013.01); *D06F 39/005* (2013.01); *D06F 39/04* (2013.01); *H02J 3/14* (2013.01); *A47L 2301/04* (2013.01); *A47L 2401/20* (2013.01); *A47L 2501/26* (2013.01); *A47L 2501/28* (2013.01); *H02J 2003/143* (2013.01); *Y02B 70/3225* (2013.01); *Y02B 70/3266* (2013.01); *Y04S 20/222* (2013.01); *Y04S 20/242* (2013.01)

(56) References Cited

U.S. PATENT DOCUMENTS

| | | | | |
|---|---|---|---|---|
| 6,229,433 B1* | 5/2001 | Rye et al. | ............... | 340/12.5 |
| 6,906,617 B1* | 6/2005 | Van der Meulen | ........... | 340/538 |
| 7,962,248 B2* | 6/2011 | Flohr | ................. | H02J 3/14 |
| | | | | 323/212 |
| 8,494,661 B2* | 7/2013 | Ewing et al. | ................. | 700/22 |
| 8,538,595 B2* | 9/2013 | Lyren | ................. | H02J 3/14 |
| | | | | 340/538 |
| 8,617,316 B2* | 12/2013 | Finch et al. | ................. | 134/18 |
| 8,769,426 B2* | 7/2014 | Brian | ................. | G06F 3/048 |
| | | | | 715/762 |
| 2003/0178894 A1* | 9/2003 | Ghent | ................. | D06F 3/02 |
| | | | | 307/140 |
| 2003/0233201 A1* | 12/2003 | Horst | ................. | H02J 3/14 |
| | | | | 700/295 |
| 2004/0224483 A1* | 11/2004 | Takyu et al. | ................. | 438/462 |
| 2008/0215263 A1* | 9/2008 | Flohr | ................. | 702/62 |
| 2010/0146712 A1* | 6/2010 | Finch et al. | ................. | 8/137 |
| 2010/0198423 A1* | 8/2010 | Hirst | ................. | G01D 4/004 |
| | | | | 700/292 |
| 2011/0087382 A1* | 4/2011 | Santacatterina et al. | ..... | 700/291 |
| 2011/0125337 A1* | 5/2011 | Zavadsky et al. | ............ | 700/291 |
| 2011/0148390 A1* | 6/2011 | Burt et al. | ................. | 323/318 |
| 2012/0110749 A1* | 5/2012 | Park | ................. | D06F 9/005 |
| | | | | 8/137 |

FOREIGN PATENT DOCUMENTS

| | | |
|---|---|---|
| JP | 2007-236538 A | 9/2007 |
| JP | 2008-067473 A | 3/2008 |

* cited by examiner

FIG. 9

HOUSEHOLD ELECTRICAL APPLIANCE AND METHOD FOR CONTROLLING HOUSEHOLD ELECTRICAL APPLIANCE

This application is a 371 application of PCT/JP2011/005667 having an international filing date of Oct. 7, 2011, which claims priority to JP2010-237940 filed Oct. 22, 2010, the entire contents of which are incorporated herein by reference.

TECHNICAL FIELD

The present invention relates to a household electrical appliance in which the operation start time or operation end time is controlled and to a method for controlling a household electrical appliance.

BACKGROUND ART

In the conventional electrical water heaters and heat-pump hot-water feeders, hot water stored in a storage tank is typically produced at night when the power demand is low and used during the daytime. As a result, the operation of appliances is shifted to the nighttime when the power demand is lower than during the daytime, thereby making it possible to level the power load. Further, the electricity cost can be reduced for the user by using electricity in the nighttime when the electricity rate is low.

Further, the time-zone-depending electricity rate system is presently used in which the electricity rate differs for each preset time zone. In the future, the environment relating to power usage, such a wide spread of solar cells, installation of storage batteries, and development of new household electrical units will change significantly, and real time pricing (RTP) in which the electricity rate changes in real time will be introduced.

A system in which, in addition to the conventional nighttime use of electrical water heaters and heat-pump hot-water feeders, household electrical appliances such as refrigerators, washing machines, and rice cookers are connected via a network to a server and load leveling and power rate reduction are performed by changing the usage time zone of the household electrical appliances with the server has been suggested as a method for additional load leveling and power rate reduction to meet the demands of such new environment (see, for example, Patent Literature 1). In the system described in Patent Literature 1, the user inputs the desired usage time of household electrical appliances by operating an input operation panel. Further, a configuration is disclosed in which at the server side connected to the household electrical appliances, an optimum usage time zone plan is created with consideration for the usage time desired by the user and characteristics of the household electrical appliances that are to be used, and the household electrical appliances are controlled according to this plan.

However, in the above-described conventional technique, although the algorithm for shifting the operation time interval of household electrical appliances to the optimum time zone with consideration for the electricity rate or the like is described, how to use the time shift functions of household electrical appliances is not sufficiently investigated.

The advantage of using the time shift function by operating the input operation panel installed at the household electrical appliances and used in the conventional manner is that the traditional operation method can be employed and intuitive input/operations are performed. However, the conventional input operation panels installed at the household electrical appliances have not been designed under an assumption of displaying information relating to a time shift. Therefore, when the conventional input operation panel is used as is, limitations and restrictions are placed on the display contents and the entire information relating to a time shift cannot be sufficiently displayed. The resultant demerit is a lack of convenience for the user using the time shift function.

CITATION LIST

Patent Literature

Patent Literature 1: Japanese Patent Application Publication No. 2008-067473

SUMMARY OF THE INVENTION

The present invention has been created to resolve the above-described problems and it is an object thereof to provide a household electrical appliance and a method for controlling a household electrical appliance which take into consideration the convenience for the user using the time shift function.

The household electrical appliance according to one aspect of the present invention is a household electrical appliance equipped with a time shift function of performing timer presetting processing on the basis of a time shift computation result indicating an operation start time or an operation end time at which an electricity cost relating to operation is the lowest, this household electrical appliance including: an input operation unit for allowing a user to perform operations for operating the household electrical appliance; a display unit for displaying information relating to the operation of the household electrical appliance; and an operation control unit for controlling the operation of the household electrical appliance on the basis of the time shift computation result, wherein when the user operates a start button of the input operation unit, the operation control unit automatically performs the timer presetting processing on the basis of the time shift computation result and causes the display unit to display the timer preset time.

With the above-described configuration, the household electrical appliance is provided with the time shift function of performing the timer presetting processing on the basis of the time shift computation result indicating an operation start time or an operation end time at which an electricity cost relating to operation is the lowest, and where the user operates the start button of the input operation unit, the operation control unit automatically performs the timer presetting processing on the basis of the time shift computation result.

As a result, the user can automatically preset the timer to a time zone in which the electricity cost relating to the operation of the household electrical appliance is the lowest by a very simple operation of pushing the start button of the input operation unit provided at the household electrical appliance. Furthermore, since the timer preset time obtained by the abovementioned automatic timer presetting processing is displayed at the display unit, the user can thereby verify that the automatic timer presetting has been performed and confirm the timer preset time (operation start time or operation end time) at which the electricity cost relating to the operation of the household electrical appliance is the lowest.

In accordance with the present invention, even when the time shift function is used by utilizing the conventional operation panel or remote controller provided at the household electrical appliance as the input operation unit or display unit, the intuitive input operation can be performed, while relying on the traditional operation method. Therefore, convenience for the user using the household electrical appliance equipped with the time shift function can be improved.

Objectives, features, and advantages of the present invention will become more apparent from the following detailed explanation and the appended drawings.

DESCRIPTION OF EMBODIMENTS

The embodiments of the present invention will be explained below with reference to the appended drawings. The embodiments below are examples of specific implementation of the present invention and place no limitation on the technical scope of the present invention.

Embodiment 1

Figure 1:
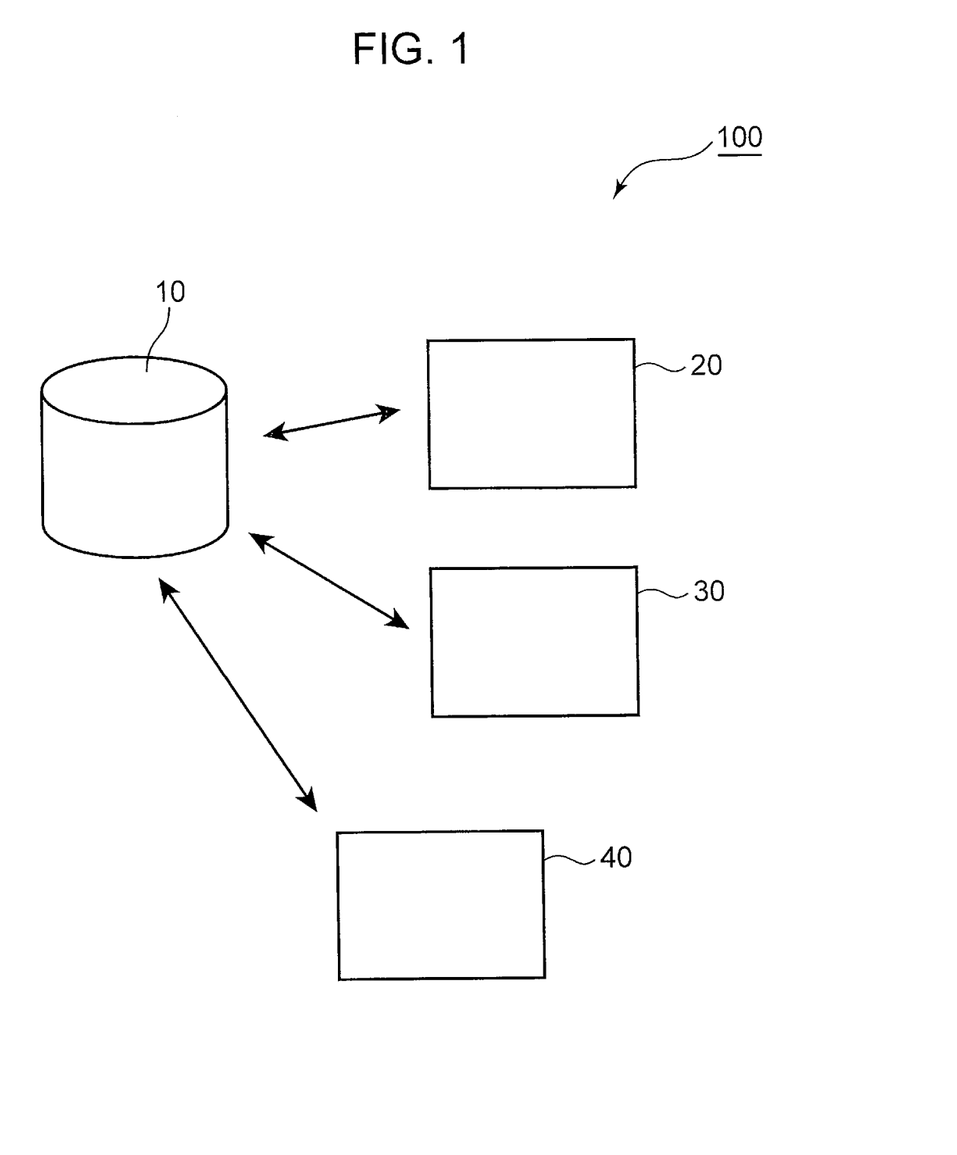
FIG. 1 is an explanatory drawing illustrating the schematic configuration of the apparatus control system according to an embodiment of the present invention.

FIG. 1 is an explanatory drawing illustrating the schematic configuration of the apparatus control system according to an embodiment of the present invention. The apparatus control system 100 shown in FIG. 1 includes an apparatus control device 10 and household electrical appliances 20, 30, and 40.

In the present embodiment, an example is explained in which the household electrical appliance is a washer-dryer, but the household electrical appliance of the present invention is not limited to the washer-dryer, and the present invention can be advantageously applied, for example, to an air conditioner equipped with a function of timer presetting operation for the start of operation and a function of timer presetting operation for the end of operation and also to washers, clothing driers, electromagnetic cookers (IH), electric water heaters, dishwashing machines, rice cookers, and biological waste processors.

The apparatus control device 10 and the household electrical appliances 20, 30, and 40 are connected to each other so as to be capable of exchanging information by a wireless or wire home network. FIG. 1 shows the configuration in which three household electrical appliances are connected to the apparatus control device 10, but the present invention is not limited to such a configuration and at least one household electrical appliance may be connected to the apparatus control device 10.

In the present embodiment, a case is explained in which the apparatus control device 10 and the household electrical appliances 20, 30, and 40 are provided inside the house, but the apparatus control device 10 may be also provided outside. Further, a configuration may be also used in which any of the household electrical appliances 20, 30, and 40 is provided with the below-described functions of the apparatus control device 10 by communicatively connecting the household electrical appliances 20, 30, and 40 disposed inside the house to each other with a wire or wireless communication means.

In the explanation below, the configuration and operation of the household electrical appliance (washer-dryer) 20 is explained, but this explanation of the configuration and operation is also applicable to the household electrical appliance 30 and the household electrical appliance 40. Such explanations are herein omitted.

Figure 2:
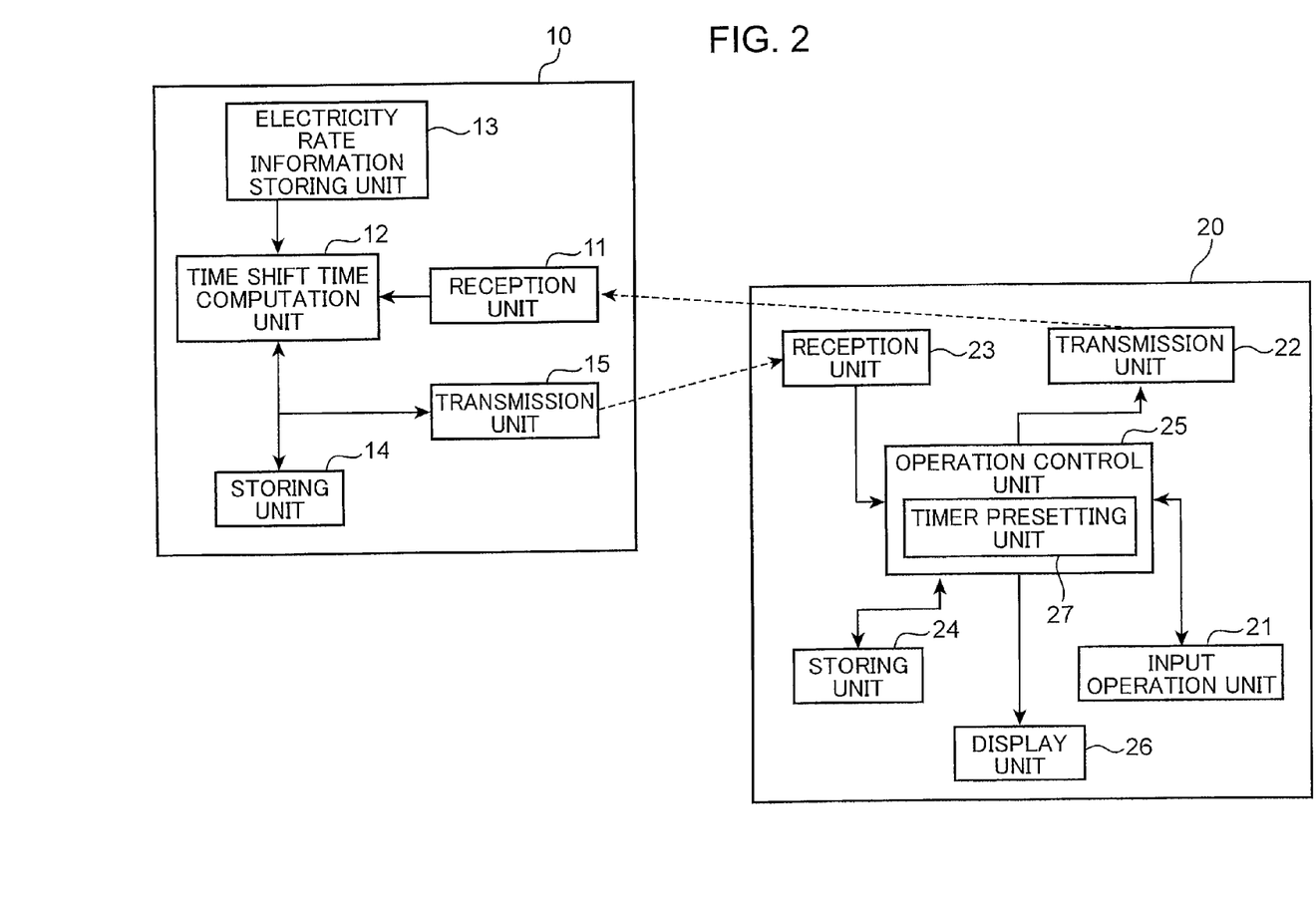
FIG. 2 is a functional block diagram of the apparatus control system according to the embodiment of the present invention.

As shown in FIG. 2, the apparatus control device 10 includes a reception unit 11, a time shift time computation unit 12, an electricity rate information storing unit 13, a storing unit 14, and a transmission unit 15. Functions and operation of the apparatus control device 10 are described below.

The household electrical appliance 20 is provided with an input operation unit 21, a transmission unit 22, a reception unit 23, a storing unit 24, an operation control unit 25, and a display unit 26.

The input operation unit 21 is, for example, an input terminal equipped with an operation screen or the like and allows the user to receive the input of various types of information for performing the operations relating to the operation of the household electrical appliance 20. More specifically, by operating the input operation unit 21, the user can perform the input indicating the operation start of the household electrical appliance 20, timer preset time and an instruction to change the timer preset time, and an instruction to cancel the timer preset time. The input operation unit 21 outputs the operation start signal of the household electrical appliance 20 together with the operation period information, electric power information, and allowed period information to the transmission unit 22 via the operation control unit 25.

In the present embodiment, the washer-dryer is used as the household electrical appliance 20. Therefore, by selecting a washing course (standard course, economy course, short-time course, or the like) with the input operation unit 21, it is possible to specify the operation period information and electric power information corresponding to this washing course. Therefore, it is not necessary for the user to input the operation period information and electric power information. Essentially, when the allowed period information, operation period operation and electric power information are specified by some input information, the user is not required to input the information of each type.

The allowed period (time shift period) is a time shift period in which the operation is allowed even if the operation start time is delayed. The allowed period (time shift period) can be set by the user to any value according to the usage mode by using the input operation unit 21. A different allowed period may be stored for each household electrical appliance, or the allowed period may be changed according to the desired operation time or the operation time of the appliance. Where the time shift computation period is determined at the apparatus control device 10 side, it is not particularly necessary to transmit the allowed period information.

The storing unit 24 may be also configured to store in advance a conversion correspondence table in which the operation period information and electric power information corresponding to the washing course are determined. During the operation of the household electrical appliance (washer-dryer) 20, a plurality of steps (for example, a washing step, a dewatering step, a drying step, and the like) is conducted sequentially. Therefore, the operation period information and electric power information become complex. Accordingly, the storing unit 24 may be configured to store additionally a plurality of types of electric power information for each sensor result, such as the washing course, weight of the clothing to be washed, and external air temperature.

Where the user indicates the operation start of the household electrical appliance 20 by operating the input operation unit 21, the transmission unit 22 transmits the operation period information, electric power information, and allowed period information together with an operation start signal to the apparatus control device 10 side.

The reception unit 23 of the household electrical appliance 20 receives the operation start time as the time shift time transmitted from the transmission unit 15 on the apparatus control device 10 side.

The operation control unit 25 is provided with a timer presetting unit 27. The display unit 26 is constituted, for example, by a liquid crystal display device and displays the operation start time of the household electrical appliance 20 that has been set by the timer presetting unit 27. Where the reception unit 23 receives the operation start time (time shift time), the timer presetting unit 27 sets the received operation start time as the timer preset time. The operation start time that has been set in the timer presetting unit 27 is displayed as the timer preset time at the display unit 26. Further, the timer presetting unit 27 stores the set operation start time, and the operation control unit 25 controls the operation of the household electrical appliance 20 on the basis of the operation start time that has been stored in the timer presetting unit 27. Thus, where the present time is the operation start time that has been stored in the timer presetting unit 27, the operation control unit 25 outputs the start signal and performs the control such as to start the operation of the household electrical appliance 20.

The present embodiment has the following feature that will be described hereinbelow: where the user pushes a start button $S_S$ of the input operation unit 21 to indicate the operation start of the household electrical appliance 20, the timer presetting processing is performed automatically at the apparatus control device 10 side and the timer preset time is displayed at the display unit 26.

The configuration of the apparatus control device 10 is explained below.

The reception unit 11 of the apparatus control device 10 receives the operation start signal of the household electrical appliance 20 from the transmission unit 22 of the household electrical appliance 20. Further, the transmission unit 15 of the apparatus control device 10 transmits to the household electrical appliance 20 the operation start time as the result of computations performed in the time shift time computation unit 12 and stored in the storing unit 14.

The electricity rate information storing unit 13 stores the electricity rate information indicating the electricity rate that changes with time. The electricity rate information is supplied, for example, from an electric power supply company. The apparatus control device 10 acquires the electricity rate information of each day, for example, at the previous day and stores the electricity rate information in the electricity rate information storing unit 13. The electricity rate information stored in the electricity rate information storing unit 13 is read out and outputted to the time shift time computation unit 12.

For example, the electricity rate information represents variations in electricity rate per 1 kWh in 24 h. This reflects the real-time pricing in which the electricity cost changes in real time because the system for supplying electric power to the house changes significantly when a power supply source such as a solar cell and a fuel cell, or a storage battery is disposed in the house where household electrical appliances are located.

The real-time pricing as referred to herein generally indicates electricity rate information that is provided in advance by an electric power supply company. Further, the real-time pricing sometimes indicates not only the electricity rate information from the electric power supply company, but also apparatus operation information, for example, information on the electric power supply source and storage battery in the house, and electricity rate information obtained from the past results relating to buying electricity rate information and selling electricity rate information.

The apparatus control device 10 does not necessarily have the electricity rate information storing unit 13. For example, instead of the configuration in which the electricity rate information is read from the electricity rate information storing unit 13, a configuration may be used in which when a time shift time is set by the time shift time computation unit 12, the external server managed by the electric power supply company is accessed to acquire the electricity rate information from the external server.

As described hereinabove, the electricity rate information may be not only the electricity rate information from the electric power supply company, but also electricity rate information adapted only in a certain house that is obtained from the past results relating to information on a buying electricity rate and information on a selling electricity rate. Essentially, it is important that the electricity rate changing with time be known, and a method for acquiring this information is not important.

The time shift time computation unit 12 computes the operation start time at which the electricity cost related to the operation of the household electrical appliance 20 is the lowest on the basis of the operation start indication signal received by the reception unit 11, power consumption information relating to the household electrical appliance 20, electricity rate information read from the electricity rate information storing unit 13, and allowed period information.

The storing unit 14 stores the optimum operation start time of the household electrical appliances 20, 30, and 40 as a computation result of the time shift time computation unit 12. The optimum operation start time of the household electrical appliance 20 is transmitted from the transmission unit 15 to the household electrical appliance 20 side.

Figure 3:
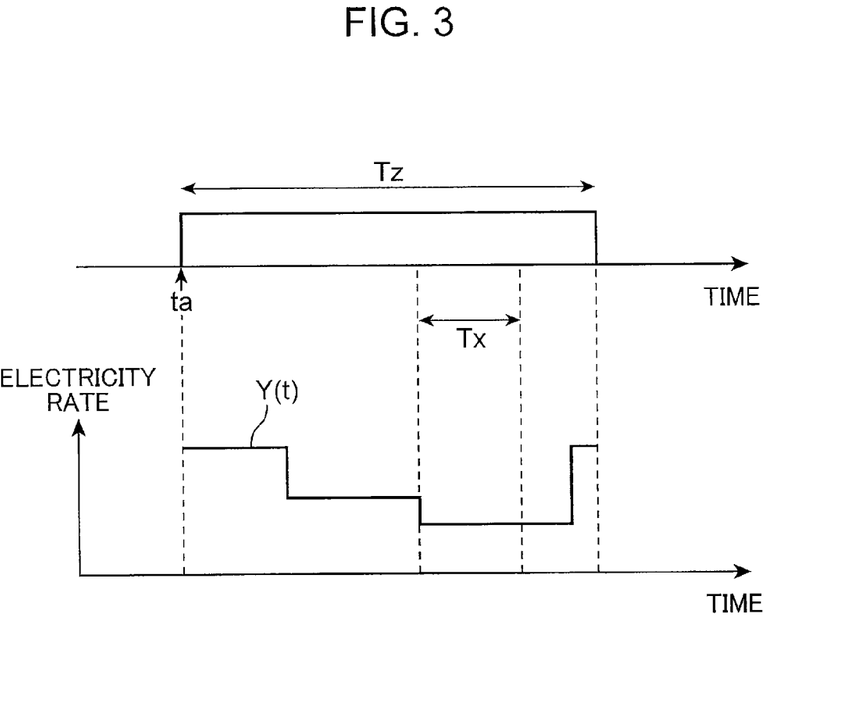
FIG. 3 is a schematic diagram for explaining the time shift period and operation period according to the embodiment of the present invention.

FIG. 3 is a schematic diagram illustrating the time shift period, which represents the period in which the operation start time of the household electrical appliance can be shifted, and the operation period. In the upper figure in FIG. 3, a time is plotted against the abscissa. In the lower figure in FIG. 3, a time is plotted against the abscissa and an electricity rate Y(t) (yen/kWh) is plotted against the ordinate. Where the operation start indication is issued by the input operation unit 21 at a present time ta, the time shift time computation unit 12 sets a time shift period (allowed period) Tz having, for example, a time width of 12 h, from the time at which the operation start indication has been issued.

The time shift time computation unit 12 computes the operation period Tx in which the electricity cost billed when the household electrical appliance 30 is operated within the time shift period Tz is the lowest on the basis of the desired time information, operation period information, electric power information and electricity rate information (electricity rate Y(t)), and computes the operation start time on the basis of the operation period Tx. The time shift time computation unit 12 computes the electricity cost billed when the household electrical appliance 20 is operated by using Equation (1) below. Thus, the time shift time computation unit 12 can calculate the electricity cost that will be billed by multiplying the electricity rate Y(t) for each time zone by the electric power P(t) required for the operation of the household electrical appliance 30 and integrating the resultant value over the operation period from an operation start time t1 to an operation end time t2 within the time shift period.

$$\text{Electricity cost} = \int_{t1}^{t2} \{Y(t) \cdot P(t)\} dt \qquad \text{Equation (1)}$$

When the electricity rate is determined by the peak electric power within a specific period, the electric power P(t) is determined by factors other than time. Further, a configuration may be also used in which when a plurality of operation periods Tx with the lowest electricity cost is extracted, the time shift time computation unit 12 selects the scheduled operation period Tx for which the operation end time is the closest to the desired operation end time, from among the plurality of operation periods Tx.

The operation of the apparatus control system 100 in the present embodiment will be explained below with reference to FIGS. 4 to 8.

Figure 4:
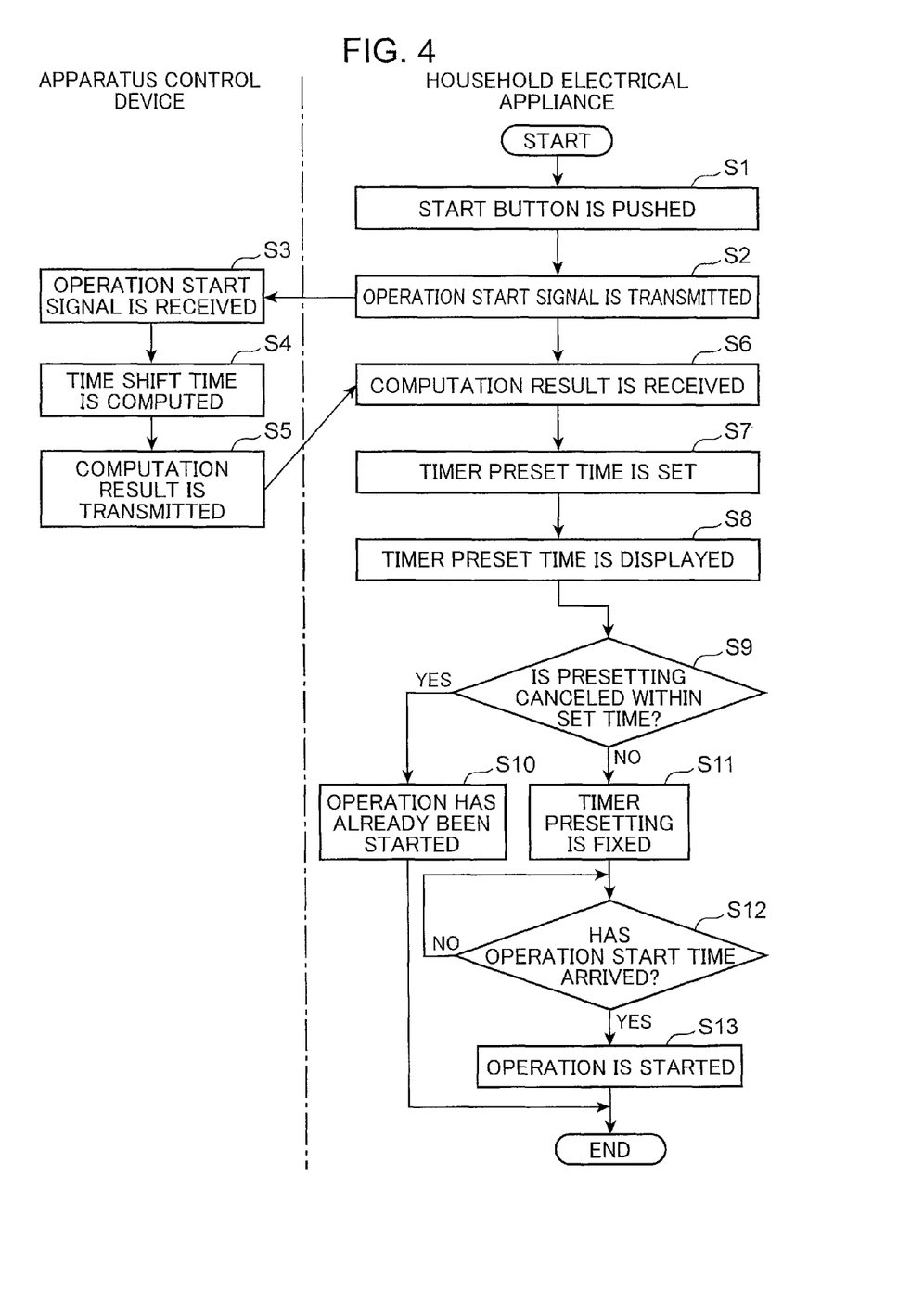
FIG. 4 is a flowchart for explaining the operation of the apparatus control system according to the embodiment of the present invention.
Figure 5:
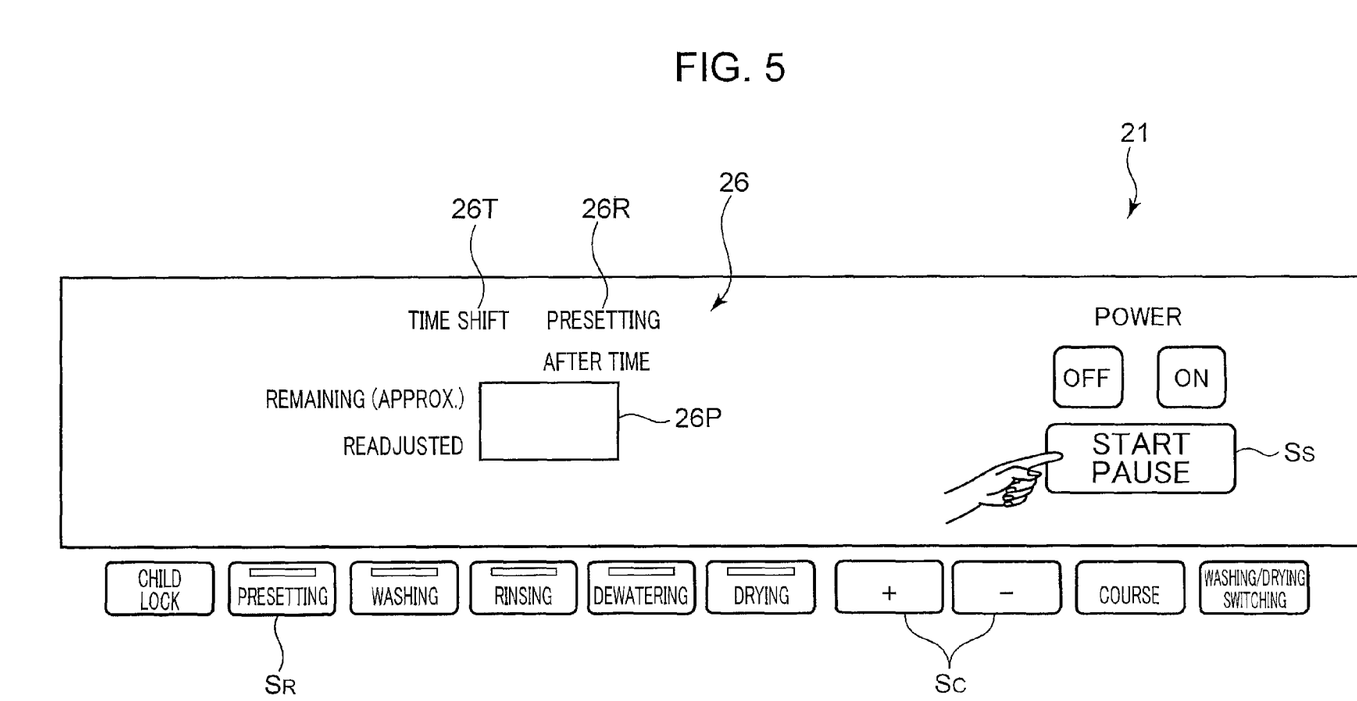
FIG. 5 is an explanatory drawing illustrating an example of the input operation unit of the household electrical appliance according to the embodiment of the present invention.
Figure 6:
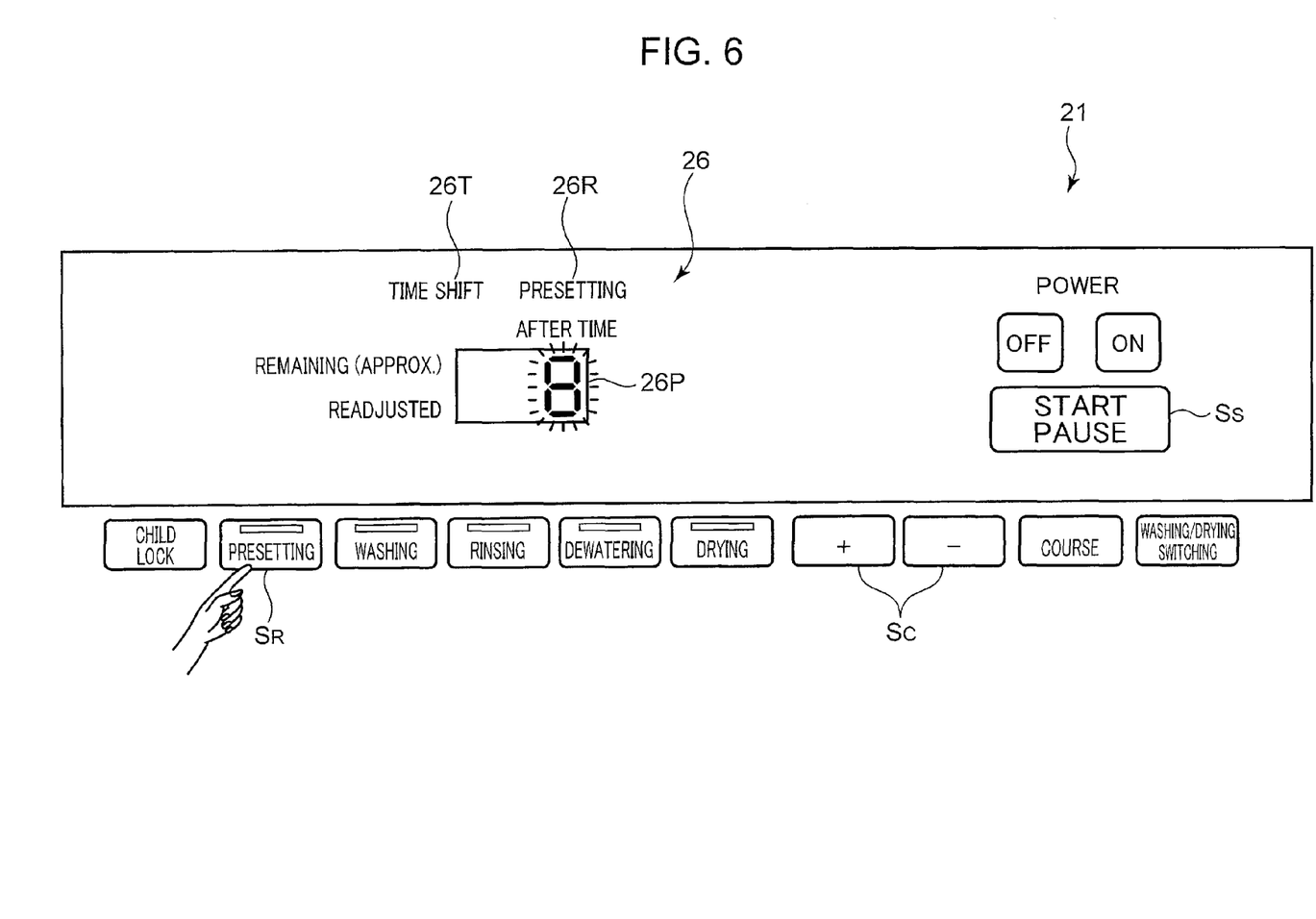
FIG. 6 is an explanatory drawing illustrating another example of the input operation unit of the household electrical appliance according to the embodiment of the present invention.
Figure 7:
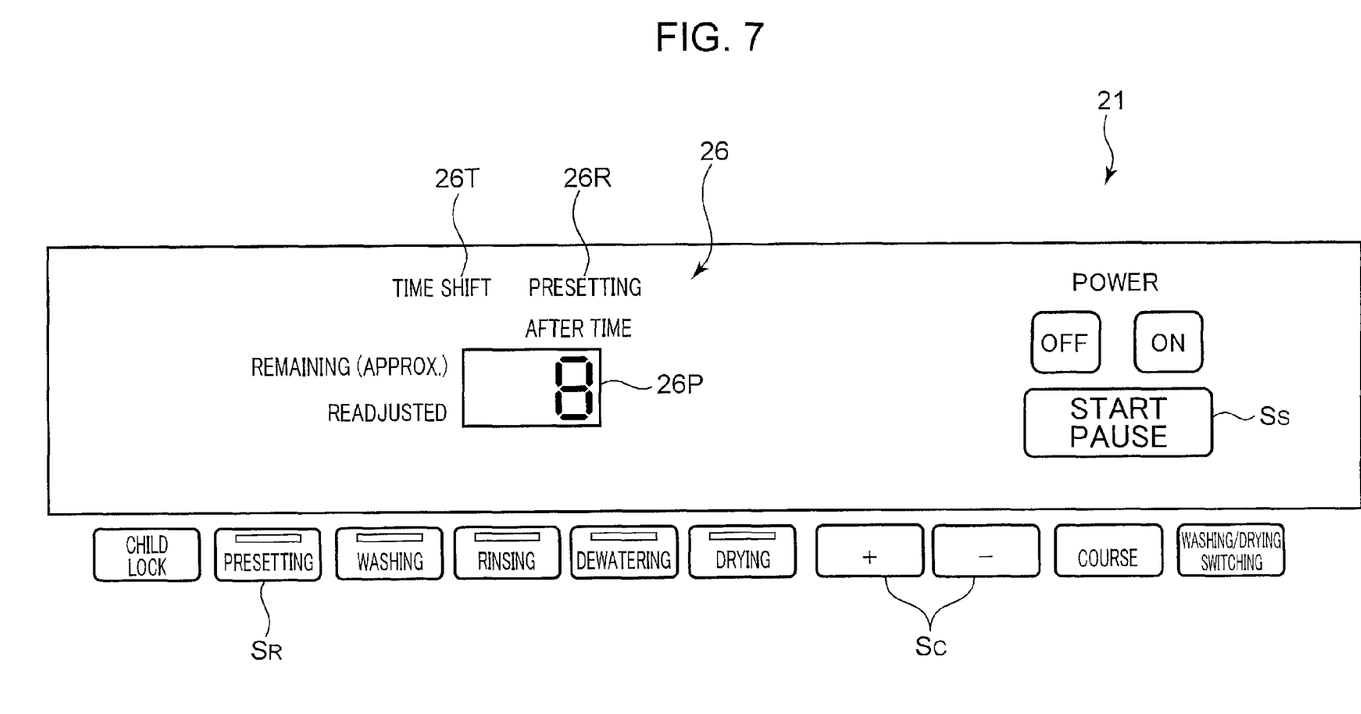
FIG. 7 is an explanatory drawing illustrating yet another example of the input operation unit of the household electrical appliance according to the embodiment of the present invention.
Figure 8:
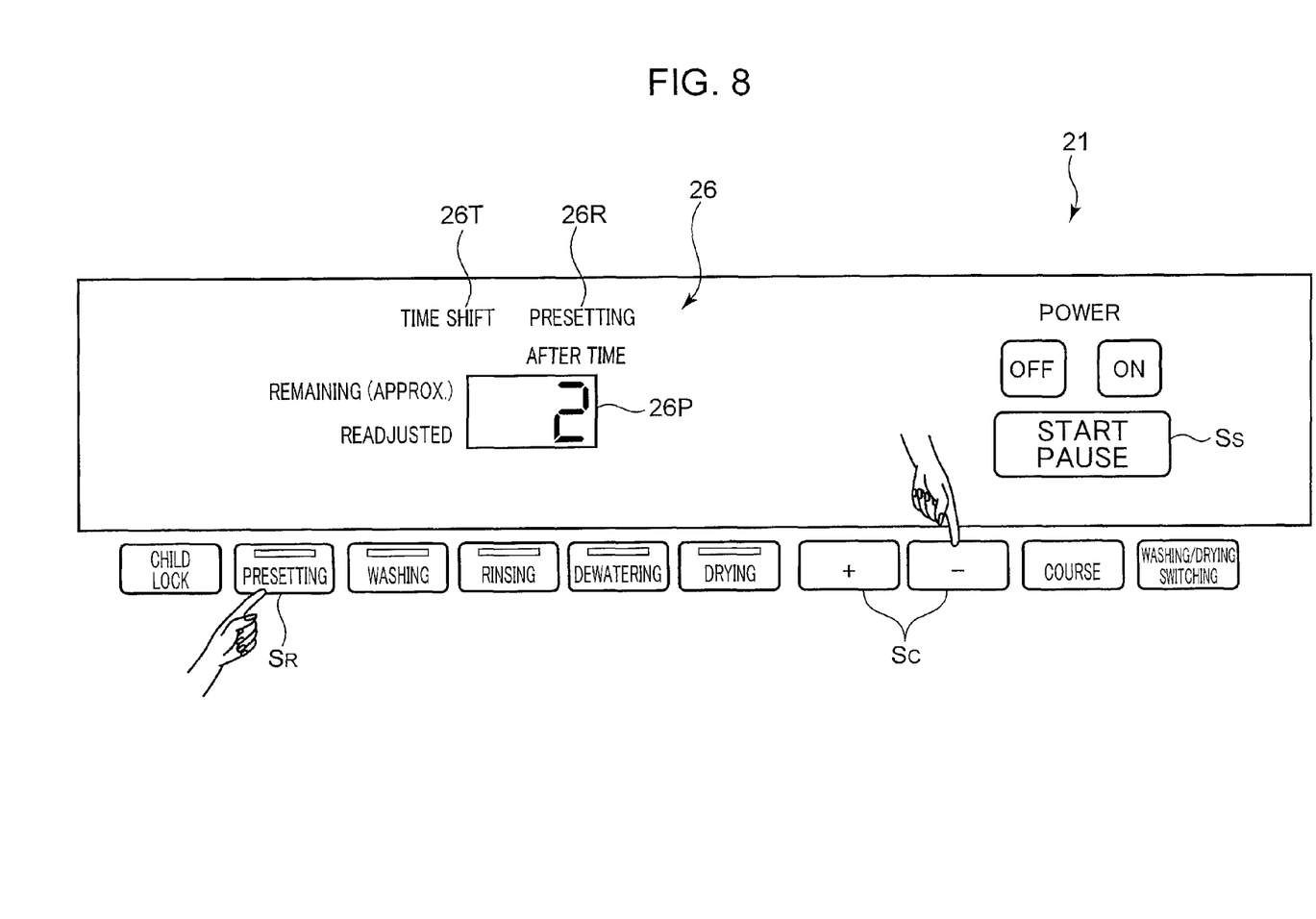
FIG. 8 is an explanatory drawing illustrating still another example of the input operation unit of the household electrical appliance according to the embodiment of the present invention.

FIG. 4 is a flowchart for explaining the operation of the apparatus control system according to Embodiment 1. FIG. 5 illustrates a state in which the user has pushed the start button $S_S$ as an example of the input operation unit 21 of the household electrical appliance 20 according to the present embodiment. FIG. 6 illustrates a state in which the timer preset time is displayed by blinking as another example of the input operation unit 21 of the household electrical appliance 20 according to the present embodiment. FIG. 7 illustrates a state in which the timer preset time is displayed by lighting up as another example of the input operation unit 21 of the household electrical appliance 20 according to the present embodiment. FIG. 8 illustrates a state in which an increase/decrease button (+ button and − button) $S_C$ is pushed to adjust the timer preset time as yet another example of the input operation unit 21 of the household electrical appliance 20 according to the present embodiment.

Where the user pushes the start button $S_S$ of the input operation unit 21 of the household electrical appliance 20 in step S1 (FIG. 5), the operation start signal is transmitted from the transmission unit 22 to the reception unit 11 of the apparatus control device 10 (S2). Where the reception unit 11 receives the operation start signal at the apparatus control device 10 side (S3), the time shift time computation unit 12 automatically computes the operation start time at which the electricity cost relating to the operation of the household electrical appliance 20 is the lowest (S4). Thus, the time shift time computation unit 12 computes the operation start time at which the electricity cost relating to the operation of the household electrical appliance 20 is the lowest on the basis of the operation start signal received by the reception unit 11, information relating to the timer presetting of another household electrical appliance, power consumption information, and electricity rate information read from the electricity rate information storing unit 13. As the operation start time at which the electricity cost relating to the operation of the household electrical appliance 20 is the lowest, for example, the operation start time for the household electrical appliance 20 is computed such that the operation is performed within the time zone in which the electricity cost billed when the household electrical appliance 20 is operated is the lowest within the time shift period (allowed period) from the present time till after a predetermined time (for example, after 12 h).

The abovementioned allowed time is a period in which the operation is allowed, even if the operation start time is delayed with respect to the present time (time at which a presetting button $S_R$ is pushed). A configuration in which the preset allowed period is stored or a configuration in which the user can set any period according to the usage mode may be used. A different allowed period may be set for each household electrical appliance, or the allowed period may differ according to the desired operation time or operation time of the apparatus.

The time shift time computation unit 12 also stores the operation start time (time shift time), which is the computation result, in the storing unit 14. The transmission unit 15 of the apparatus control device 10 transmits the operation start time to the reception unit 23 of the household electrical appliance 20 (S5). Where the reception unit 23 of the household electrical appliance 20 receives the operation start time in step S6, the timer presetting unit 27 of the operation control unit 25 sets the received operation start time as the timer preset time (S7). The operation start time set in the timer presetting unit 27 is displayed as the timer preset time at the display unit 26 (S8). In this case, as shown in FIG. 6, "8" indicating the timer preset time (after 8 h) is displayed by blinking, rather than by lighting up. When the user inputs the timer preset time, the display is performed by lighting up, rather than by blinking. Therefore, by the aforementioned blinking display, the user can recognize not only the preset time indicated by his own input operation, but also the operation start time (time shift time) at which the electricity cost relating to the operation of the household electrical appliance 20, which has been derived as the result of computations performed at the apparatus control device 10 side, is the lowest.

As described hereinabove, the present household electrical appliance 20 has a time shift function of performing the timer presetting processing on the basis of the time shift computation result indicating the operation start time or operation end time at which the electricity cost relating to the operation is the lowest, and where the user operates the start button $S_S$ of the input operation unit 21, the operation control unit 25 automatically performs the timer presetting processing on the basis of the aforementioned time shift computation result.

A method for controlling a household electrical appliance according to the present embodiment is a method for controlling a household electrical appliance equipped with a time shift function of performing the timer presetting processing on the basis of the time shift computation result indicating the operation start time or operation end time at which the electricity cost relating to the operation of the household electrical appliance is the lowest, this control method including a timer presetting processing step of performing automatically the timer presetting processing on the basis of the time shift computation result when the start button $S_S$ of the household electrical appliance 20 is operated by the user and a display step of displaying the timer preset time at the display unit 26 of the household electrical appliance 20.

As a result, the user can automatically perform the timer presetting such that the electricity cost relating to the operation of the household electrical appliance 20 is the lowest by a very simple operation of pushing the start button $S_S$ of the input operation unit 21 provided in the household electrical appliance 20. Further, since the timer preset time obtained by the automatic timer presetting processing is displayed at the display unit 26, the user can thereby verify that the automatic timer presetting has been performed and confirm the timer preset time (operation start time or operation end time) at which the electricity cost relating to the operation of the household electrical appliance 20 is the lowest.

In this case, even when the time shift function is used by utilizing the conventional operation panel or remote controller provided at the household electrical appliance as the input operation unit or display unit, the intuitive input operation can be performed, while relying on the traditional operation method. As a result, convenience for the user using the household electrical appliance equipped with the time shift function can be improved.

Further, it is preferred that the display unit 26 use a different display state of the timer preset time in a period till an indication of timer presetting cancelation is inputted from the input operation unit 21 within the aforementioned predetermined time interval and outside this period.

With such a configuration, since the display state of the timer preset time is made to differ from that outside the aforementioned period, the user can easily verify that the timer preset time displayed at the display unit 26 is the timer preset time (time shift time) which is obtained by the automatic timer presetting processing and in which the electricity cost relating to the operation of the household electrical appliance 20 is the lowest, rather than the preset time indicated by the input operation performed by the user.

The display of the time shift time is not limited to the above-mentioned blinking display, provided that the display makes it possible to distinguish the time shift time from the preset time indicated by the user by an input operation. For example, a configuration may be used in which when the time shift time (operation start time) obtained by computations at the apparatus control device 10 side is displayed at a display panel 26P in the display unit 26 shown in FIGS. 6 to 9, a time shift display 26T is lighted up, but when the preset time inputted by the user is displayed, a presetting display 26R is lighted up, thereby allowing the user to distinguish the time shift time from the preset time. A configuration may be also used in which the user can distinguish between the time shift time obtained by computations at the apparatus control device 10 side and the preset time inputted by the user by displaying the times with different colors.

Where an indication of timer presetting cancelation has been inputted from the input operation unit 21 to the timer presetting unit 27 within a predetermined time interval after the timer preset time has been displayed at the display unit 26 in step S8 (YES in S9), the operation control unit 25 performs the control such that the household electrical appliance 20 is immediately actuated (S10). Meanwhile, when an indication of timer presetting cancelation has not been inputted from the input operation unit 21 to the timer presetting unit 27 within a predetermined time interval (for example, within 10 min) after the timer preset time has been displayed at the display unit 26 (NO in S9), the operation control unit 25 fixes the timer presetting displayed at the display unit 26 (S11). In this case, as shown in FIG. 7, the blinking display of "8" showing the timer preset time (after 8 h) is switched to light-up display, and the user can verify that the timer preset time (after 8 h) has been established.

It goes without saying that the predetermined time interval is not limited to 10 min and can be set to an adequate time interval for each household electrical appliance.

Thus, in the present embodiment, it is preferred that where an indication of timer presetting cancelation has been inputted from the input operation unit 21 to the timer presetting unit 27 of the operation control unit 25 within a predetermined time interval after the timer preset time has been displayed at the display unit 26, the operation control unit 25 immediately actuate the household electrical appliance 20.

The user of the household electrical appliance 20 equipped with the above-described automatic timer presetting function might wish to actuate the household electrical appliance 20 immediately, without timer presetting. With the above-described configuration, the user can cancel the timer presetting and immediately actuate the household electrical appliance 20 by a simple operation of the input operation unit 21, provided that this operation is performed within a predetermined time interval after the automatic timer presetting processing has been performed by the operation of the start button $S_S$ of the input operation unit 21 and the timer preset time (after 8 h) has been displayed at the display unit 26. As a result, the additional improvement of convenience for the user using the household electrical appliance 20 equipped with the time shift function can be realized. The timer presetting cancelation operation can be also easily realized by using the already available input operation panel or remote controller of the household electrical appliance as the input operation unit 21 or display unit 26.

Further, where the timer presetting unit 27 of the operation control unit 25 has not inputted the indication of timer presetting cancelation from the input operation unit 21 within a predetermined time interval after the timer presetting time has been displayed at the display unit 26, the timer presetting unit 27 fixes the timer presetting.

As a result, where the operation start time (time shift time) at which the electricity cost relating to the operation of the household electrical appliance 20, which is derived as the result of computations at the apparatus control device 10 side, is the lowest is not satisfied, the user can fix the timer presetting, without performing any operation, by leaving a matter as it is in a state with the displayed operation start time.

The user can also change the timer presetting time determined by the automatic timer presetting processing to the desired operation start time by a simple operation of the increase/decrease button (time adjustment button) $S_C$.

As a result, for example, when the timer preset time is after 8 h and the operation has been started after 8 h, but the desired processing of the household electrical appliance is not completed within the desired time interval, the preset start time can be expedited by a simple operation of the increase/decrease button $S_C$. Conversely, the user might sometimes prefer to start the operation even later than after 8 h. In such a case, the user can delay the preset start time by a simple operation of the increase/decrease button $S_C$. The operation of increasing/decreasing the timer preset time can be also easily realized by using the already available input operation panel or remote controller of the household electrical appliance 20 as the input operation unit 21 or display unit 26.

The operation control unit 25 determines whether or not the present time is the operation start time stored in the timer presetting unit 27 (S12). Where it is determined that the present time is not the operation start time stored in the timer presetting unit 27 (NO in S12), a standby state is assumed, and the determination processing of step S12 is repeated at a predetermined timing till the present time becomes the operation start time stored in the timer presetting unit 27.

Meanwhile, where it is determined that the present time is the operation start time stored in the timer presetting unit 27 (YES in S12), in step S13, the operation control unit 25 starts the operation of the household electrical appliance 20 (S13). When operation conditions are inputted by the input operation unit 21, the operation control unit 25 operates the household electrical appliance 20 according to the inputted operation conditions.

Figure 9:
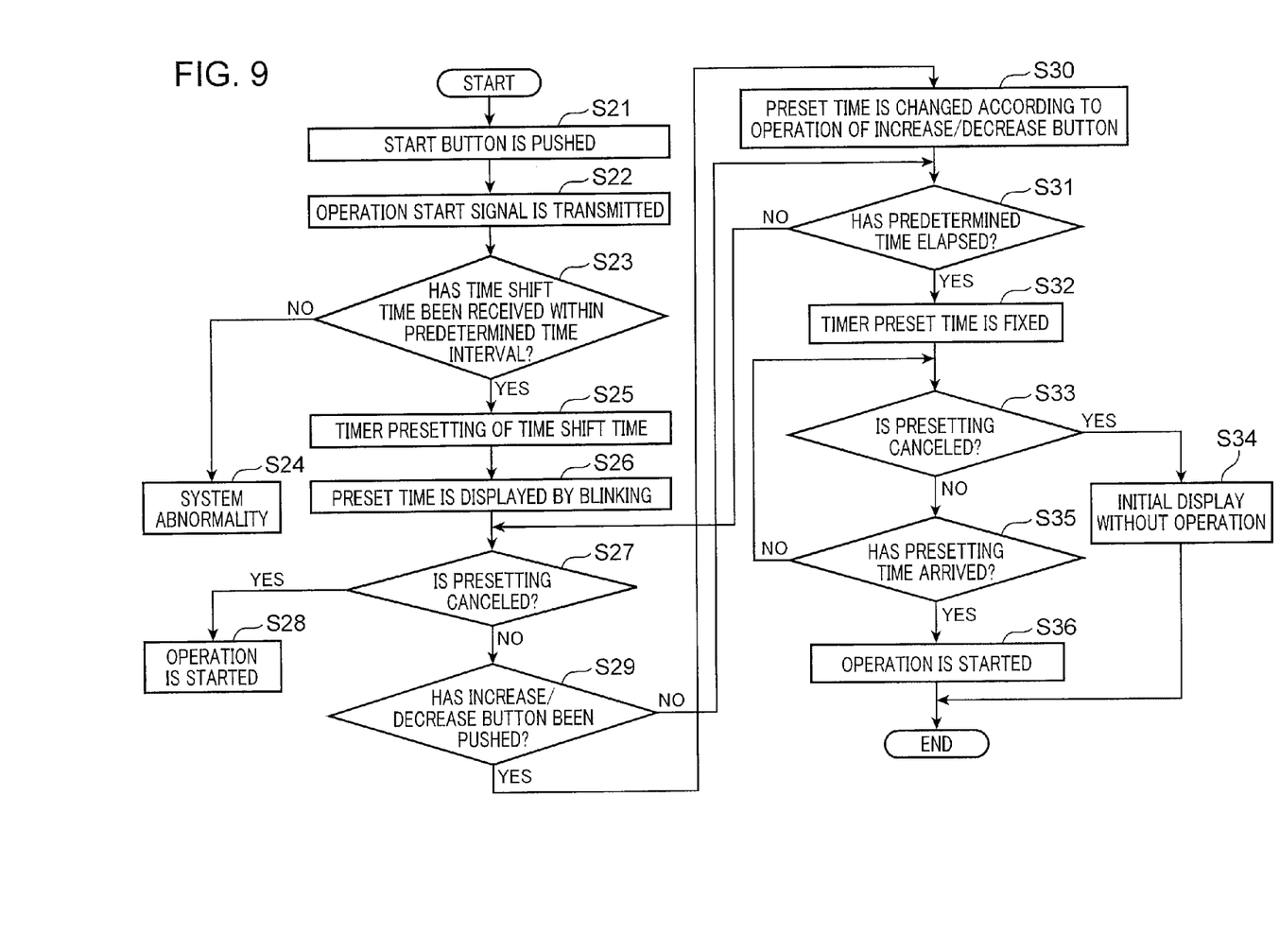
FIG. 9 is a flowchart illustrating the operation of the household electrical appliance according to the embodiment of the present invention.

FIG. 9 is a flowchart illustrating the operation of the household electrical appliance 20 in Embodiment 1.

First, in step S21, where the user pushes the start button $S_S$ of the input operation unit 21 of the household electrical appliance 20 (FIG. 5), the transmission unit 22 transmits the operation start signal to the reception unit 11 of the apparatus control device 10 (S22). Where the operation start time (time shift time) is not thereafter received from the apparatus control device 10 within a predetermined time interval (NO in S23), a system abnormality is determined (S24). Meanwhile, where the operation start time is received from the apparatus control device 10 within the predetermined time (YES in S23), the timer presetting unit 27 of the operation control unit 25 sets the operation start time as the timer preset time on the basis of the received operation start time (time shift time) (S25). Then, the operation start time that has been set in the timer presetting unit 27 is displayed by blinking as the timer preset time at the display unit 26 (S26). In this case, as shown in FIG. 7, "8" indicating the timer preset time (after 8 h) is displayed by blinking, rather than by lighting up. As a result, the user can verify that this time is the operation start time at which the electricity cost related to the operation of the household electrical appliance 20 and derived as the result of computations performed at the apparatus control device 10 side is the lowest, rather than the preset time indicated by the input operation performed by the user.

When an indication of timer presetting cancelation is inputted by operating the input operation unit 21 within a predetermined time since the timer preset time has been displayed at the display unit 26 in step S26 (YES in S27), the operation control unit 25 performs the control such that the household electrical appliance 20 is actuated immediately (S28).

Further, it is determined whether or not the increase/decrease button (+ button and – button) $S_C$ for adjusting the timer preset time has been pushed, as shown in FIG. 8, by operating the input operation unit 21 within a predetermined time interval since the timer preset time has been displayed at the display unit 26 in step S26 (S29). Where the increase/decrease button has been pushed (YES in S29), the timer presetting unit 27 changes the displayed timer preset time (after 8 h) according to the pushing operation of the increase/decrease button $S_C$ (S30).

FIG. 8 illustrates the state in which the user pushed the – button of the increase/decrease buttons $S_C$ and the operation start time has been changed from after 8 h to after 2 h. Thus, the timer presetting unit 27 of the operation control unit 25 is configured such that the timer preset time determined as a result of time shift computations can be increased or decreased by operating the increase/decrease button $S_C$ (time adjustment button) of the input operation unit 21 within a period from when the timer preset time (after 8 h) has been displayed at the display panel 26P of the display unit 26 to when the indication of timer presetting cancelation is inputted within a predetermined time interval.

With the above-described configuration, the user can change the optimum operation start time of the household electrical appliance 20 displayed as the result of computations performed by the time shift time computation unit 12 (operation start time for the operation period in which the electricity cost is the lowest) to the desired operation start time by a simple operation of pushing the increase/decrease button $S_C$.

As a result, for example, the preset start time can be expedited by pushing the – button when the operation has been started after 8 h, but drying of the washed material is not completed within the desired time interval.

Further, when the predetermined time interval elapses without the indication of timer presetting cancelation being inputted after the timer preset time has been displayed at the display unit 26 (YES in S31), the timer presetting unit 27 of the operation control unit 25 fixes the timer preset time (S32). In this case, the timer preset time that is fixed is the operation start time (time shift time) computed at the apparatus control device 10 side when the adjustment by the increase/decrease button has not been performed, and the operation start time after the adjustment when the adjustment by the increase/decrease button has been performed.

When a presetting cancelation indication is issued to the timer presetting unit 27 after the timer presetting has been fixed in step S32 (YES in S33), the operation control unit 25 performs the control such that the household electrical appliance 20 is not actuated (S34).

Meanwhile, when no presetting cancelation indication is issued to the timer presetting unit 27 (NO in S33), the operation control unit 25 determines whether or not the present time is the timer preset time (operation start time) stored in the timer presetting unit 27 (S35). Where it is determined that the present time is not the timer preset time stored in the timer presetting unit 27 (NO in S35), the processing returns to step 33. Meanwhile, where it is determined that the present time is the timer preset time stored in the timer presetting unit 27 (YES in S35), in step S36, the operation control unit 25 start the operation of the household electrical appliance 20 (S36).

As described hereinabove, in the present embodiment, when the user inputs an indication of timer presetting cancelation by operating the input operation unit 21 from when the timer presetting is fixed to the operation start time based on the timer presetting, the operation control unit 25 performs the control such that the household electrical appliance 20 is not actuated. More specifically, by pushing the presetting button $S_R$ that is lit up on the input operation unit 21 shown in FIG. 7, the user can stop the lit-up display of the presetting button $S_R$ and cancel the timer presetting.

As a result, for example, when it is necessary for the user to leave after the presetting has been fixed, even if some irregularity occurs in the operation of the household electrical appliance 20 at the preset time, the timer presetting can be canceled and the control preventing the operation of the household electrical appliance 20 can be performed by a simple operation of the input operation unit 21, namely, by pushing the presetting button $S_R$. As a result, additional increase in convenience for the user using the household electrical appliance 20 equipped with the time shift function can be realized. Further, the timer presetting cancelation operation can be easily realized by using the already available input operation panel or remote controller of the household electrical appliance 20 as the input operation unit 21 or display unit 26.

In the present embodiment, the time shift time computation unit 12 computes the operation period Tx in which the electricity cost billed when the household electrical appliance 20 is operated is the lowest on the basis of the operation period information, allowed period information, power consumption information and electricity rate information (electricity rate Y(t)), and computes the operation start time on the basis of the scheduled operation period Tx.

However, the present invention is not limited to such a configuration, and the operation end time may be computed as the time shift time on the basis of the operation period Tx. In this case, the operation end time (time shift time) is transmitted as a computation result of the time shift time computation unit 12 from the apparatus control device 10 to the reception unit 23 of the household electrical appliance 20 and stored in the storing unit 24. The operation control unit 25 may be configured to perform the control such that the operation of the household electrical appliance 20 is started so that the operation will end at the operation end time stored in the storing unit 24.

Further, the configuration is explained in which "8" indicating the operation start time (after 8 h) is displayed as the timer preset time at the display panel 26P of the display unit 26. However, in the configuration in which the operation end time is computed, "11" indicating the operation end time (after 11 h) in the case where the operation period is 3 h may be displayed instead of "8" indicating the operation start time (after 8 h).

The above-described specific embodiments mainly include the invention having the following features.

The household electrical appliance according to one aspect of the present invention is a household electrical appliance equipped with a time shift function of performing timer presetting processing on the basis of a time shift computation result indicating an operation start time or an operation end time at which an electricity cost relating to operation is the lowest, this household electrical appliance including: an input operation unit for allowing a user to perform operations for operating the household electrical appliance; a display unit for displaying information relating to the operation of the household electrical appliance; and an operation control unit for controlling the operation of the household electrical appliance on the basis of the time shift computation result, wherein when the user operates a start button of the input operation unit, the operation control unit automatically performs the timer presetting processing on the basis of the time shift computation result and causes the display unit to display the timer preset time.

With the above-described configuration, the household electrical appliance is provided with the time shift function of performing the timer presetting processing on the basis of the time shift computation result indicating an operation start time or an operation end time at which an electricity cost relating to operation is the lowest, and where the user operates the start button of the input operation unit, the operation control unit automatically performs the timer presetting processing on the basis of the time shift computation result.

As a result, the user can automatically preset the timer to a time zone in which the electricity cost relating to the operation of the household electrical appliance is the lowest by a very simple operation of pushing the start button of the input operation unit provided at the household electrical appliance. Furthermore, since the timer preset time obtained by the abovementioned automatic timer presetting processing is displayed at the display unit, the user can thereby verify that the automatic timer presetting has been performed and confirm the timer preset time (operation start time or operation end time) at which the electricity cost relating to the operation of the household electrical appliance is the lowest.

In this case, even when the time shift function is used by utilizing the conventional operation panel or remote controller provided at the household electrical appliance as the input operation unit or display unit, the intuitive input operation can be performed, while relying on the traditional operation method. As a result, convenience for the user using the household electrical appliance equipped with the time shift function can be improved.

In the household electrical appliance, it is preferred that the operation control unit immediately actuate the household electrical appliance in a case where an indication of timer presetting cancelation has been inputted from the input operation unit within a predetermined time interval after a timer preset time has been displayed at the display unit.

The user of the household electrical appliance equipped with the above-described automatic timer presetting function might wish to actuate the household electrical appliance immediately, without timer presetting. With the above-described configuration, the user can cancel the timer presetting and immediately actuate the household electrical appliance by a simple operation of the input operation unit, provided that this operation is performed within a predetermined time interval after the automatic timer presetting processing has been performed by the operation of the start button of the input operation unit and the timer preset time has been displayed at the display unit. As a result, the additional improvement of convenience for the user using the household electrical appliance equipped with the time shift function can be realized. The timer presetting cancelation operation can be also easily realized by using the already available input operation panel or remote controller of the household electrical appliance as the input operation unit or display unit.

In the household electrical appliance, it is preferred that the operation control unit fix the timer presetting in a case where an indication of timer presetting cancelation has not been inputted from the input operation unit within a predetermined time interval after a timer preset time has been displayed at the display unit.

With such a configuration, where the timer preset time at which the electricity cost relating to the operation of the household electrical appliance which is obtained by automatic timer presetting processing is the lowest is not satisfied, the user can fix the timer presetting, without performing any operation, by leaving a matter as it is in a state with the displayed operation start time.

In the household electrical appliance it is preferred that the operation control unit perform control such that the household electrical appliance is not actuated in a case where an indication of timer presetting cancelation has been inputted from the input operation unit after the timer presetting has been fixed and before the operation start time based on the timer presetting.

With the above-described configuration, for example, by pushing the presetting button that is lit up on the input operation unit, the user can stop the lit-up display of the presetting button and cancel the timer presetting. As a result, for example, when it is necessary for the user to leave after the presetting has been fixed, even if some irregularity occurs in the operation of the household electrical appliance at the preset time, the timer presetting can be canceled and the control preventing the operation of the household electrical appliance can be performed by a simple operation of the input operation unit, for example, by pushing the presetting button. As a result, additional increase in convenience for the user using the household electrical appliance equipped with the time shift function can be realized. Further, the timer presetting cancelation operation can be easily realized by using the already available input operation panel or remote controller of the household electrical appliance as the input operation unit or display unit.

Further, in the household electrical appliance, it is preferred that the display unit use a different display state of the timer preset time within a period till an indication of timer presetting cancelation is inputted from the input operation unit within the predetermined time interval, from a display state outside this period.

With such a configuration, since the display state of the timer preset time is made to differ from that outside the aforementioned period, the user can easily verify that the timer preset time displayed at the display unit is the timer preset time (time shift time) which is obtained by the automatic timer presetting processing and in which the electricity cost relating to the operation of the household electrical appliance is the lowest, rather than the preset time indicated by the input operation performed by the user.

In the household electrical appliance, it is preferred that the operation control unit increase or decrease the timer preset time determined by the time shift computation result on the basis of a time adjustment button operation at the input operation unit within a period till an indication of timer presetting cancelation is inputted from the input operation unit within the predetermined time interval.

With such a configuration, the user can change the timer preset time obtained by the automatic timer presetting processing into the desired operation start time by a simple operation of the time adjustment button.

As a result, for example, when the timer preset time is after 8 h and the operation has been started after 8 h, but the desired processing of the household electrical appliance is not completed within the desired time interval, the preset start time can be expedited by a simple operation of the time adjustment button. Conversely, the user might sometimes prefer to start the operation even later than the timer preset time. In such a case, the user can delay the preset start time by a simple operation of the time adjustment button. The operation of increasing/decreasing the timer preset time can be also easily realized by using the already available input operation panel or remote controller of the household electrical appliance as the input operation unit or display unit.

A method for controlling a household electrical appliance according to another aspect of the present invention is a method for controlling a household electrical appliance equipped with a time shift function of performing timer presetting processing on the basis of a time shift computation result indicating an operation start time or an operation end time at which an electricity cost relating to operation is the lowest, this method including: a timer presetting processing step of performing automatically the timer presetting processing on the basis of the time shift computation result when the start button of the household electrical appliance is operated by the user; and a display step of causing the display unit of the household electrical appliance to display the timer preset time.

With such a method, the user automatically performs the timer presetting processing on the basis of the time shift computation result indicating the operation start time or operation end time at which the electricity cost relating to the operation is the lowest by pushing the start button of the input operation unit.

As a result, the user can automatically perform the timer presetting processing by a very simple operation of pushing the start button of the input operation unit provided at the household electrical appliance. Furthermore, since the timer preset time obtained by the abovementioned automatic timer presetting processing is displayed at the display unit, the user can thereby verify that the automatic timer presetting has been performed and confirm the timer preset time (operation start time or operation end time) at which the electricity cost relating to the operation of the household electrical appliance is the lowest.

In this case, even when the time shift function is used by utilizing the conventional operation panel or remote controller provided at the household electrical appliance as the input operation unit or display unit, the intuitive input operation can be performed, while relying on the traditional operation method. As a result, convenience for the user using the household electrical appliance equipped with the time shift function can be improved.

Specific embodiments or examples illustrating the implementation modes of the invention have been described for the sole purpose of illustrating the technical contents of the present invention, and the present invention should not be interpreted narrowly only to such specific examples. Rather, various modifications may be made without departing from the spirit of the invention and from the scope of the claims.

INDUSTRIAL APPLICABILITY

The household electrical appliance and a method for controlling a household electrical appliance in accordance with the present invention are suitable for a household electrical appliance, a method for controlling a household electrical appliance, and a household electrical appliance which are required to be convenient for a user using a time shift function.

The invention claimed is:

1. A household electrical appliance comprising:
an input operation unit in communication with one or more buttons that facilitates entry, by a user, of a start indication to start an operation of household electrical appliance, and a timer preset time for specifying a time at which to start the operation of the household electrical appliance;
a transmitter that communicates information to an apparatus control device to notify the apparatus control device that the user has indicated the start operation;
a receiver that receives information from the apparatus control device that defines a time shift time at which an electricity cost is lowest in response to communication of the indication that the user has indicated the start operation, wherein the time shift time corresponds to a time in the future for starting the operation of household electrical appliance;

an operation control unit in communication with the input operation unit, the transmitter, and the receiver, that, in response to receipt of the time shift time received from the apparatus control device or the timer preset time specified by the user, performs timer preset processing; and a display in communication with the operation control unit that indicates whether a start time for operating the household electrical appliance or an end time for completing the operation of the household electrical appliance is based on the timer preset time entered by the user or the time shift time received from the apparatus control device and to display an amount of time remaining between a current time and the start time or an amount of time remaining between the current time and the end time, wherein when the current time corresponds to the start time, the operation control unit controls the household electrical appliance to activate the operation selected by the user.

2. The household electrical appliance according to claim 1, wherein the time shift time is computed on the basis of operation period information, allowed period information, power consumption information, and electricity rate information.

3. The household electrical appliance according to claim 1, wherein the operation control unit performs control such that the household electrical appliance is not actuated in a case where an indication of timer presetting cancelation has been inputted from the input operation unit after the timer presetting of the time shift time has been fixed and before the operation start time based on the timer presetting.

4. The household electrical appliance according to claim 1, wherein when a time adjustment button operation is performed at the input operation unit, the operation control unit changes the time shift time to the timer preset time by the operation of the user, and increases or decreases the timer preset time.

5. A method for controlling a household electrical appliance comprising:

receiving from a user, via an input operation unit of a household electrical appliance, one or more of a start indication to start an operation of household electrical appliance, and a timer preset time for specifying a time at which to start the operation of the household electrical appliance;

communicating, via a transmitter of the household electrical appliance, information to an apparatus control device that the user has indicated the start operation;

receiving, from apparatus control device and via a receiver of the household electrical appliance, information that defines a time shift time at which an electricity cost is lowest in response to the notification that the user has indicated the start operation, wherein the time shift time corresponds to a time in the future for starting the operation of household electrical appliance;

in response to receipt of the time shift time received from the apparatus control device or the timer preset time indicated by the user performing, by an operation control unit of the household electrical appliance that is in communication with the input operation unit, the transmission unit, and the reception unit, timer preset processing ; and displaying, by a display in communication with the operation control unit, an indication of whether a start time for operating the household electrical appliance or an end time for completing the operation of the household electrical appliance is based on the timer preset time entered by the user or the time shift time received from the apparatus control device, and an amount of time remaining between a current time and the start time or an amount of time remaining between the current time and the end time, when the current time corresponds to the start time, controlling, by the operation control unit, the household electrical appliance to activate the operation selected by the user.

6. The household electrical appliance according to claim 1, wherein the operation control unit immediately actuates the household electrical appliance in a case where an indication of timer presetting cancelation is inputted from the input operation unit within a predetermined time interval after the timer preset time of the time shift time is displayed at the display unit.

7. A system for controlling an appliance, comprising:

an apparatus unit disposed within the appliance configured to:

display information indicative of whether a start time for operating the apparatus or an end time for completing the operation of the household electrical appliance is based on a timer preset time entered by a user or a received time shift time, the time shift time indicating an operation start time in the future or an operation end time in the future at which an electricity cost related to the operating is the lowest, indicate an amount of time remaining between a current time and the start time or an amount of time remaining between the current time and the end time; and when the current time corresponds to the start time, control the household electrical appliance to activate the operation selected by the user; and an apparatus control device disposed remote from the appliance configured to compute the time shift time and to communicate the time shift time to the apparatus unit.

* * * * *